United States Patent [19]
Bauman et al.

[11] Patent Number: 4,631,296
[45] Date of Patent: Dec. 23, 1986

[54] METHOD OF PRODUCING A SILICONE WATER-BASED ELASTOMER

[75] Inventors: Therese M. Bauman; Alan L. Freiberg, both of Midland, Mich.

[73] Assignee: Dow Corning Corporation, Midland, Mich.

[21] Appl. No.: 867,725

[22] Filed: May 28, 1986

Related U.S. Application Data

[62] Division of Ser. No. 830,418, Feb. 18, 1986.

[51] Int. Cl.$^4$ .............................................. C08J 9/30
[52] U.S. Cl. ........................................ 521/65; 521/71;
521/86; 521/134; 521/154; 524/859; 524/860; 528/18; 528/33; 528/34
[58] Field of Search .................. 521/65, 71, 86, 134, 521/154; 524/859, 860; 528/18, 33, 34

[56] References Cited

U.S. PATENT DOCUMENTS

| | | | |
|---|---|---|---|
| 2,843,555 | 7/1958 | Berridge | 521/154 |
| 3,355,406 | 11/1967 | Cekada | 521/154 |
| 3,706,695 | 12/1972 | Huebner et al. | 252/511 |
| 3,830,760 | 8/1984 | Bengtson | 521/154 |
| 4,221,688 | 9/1980 | Johnson et al. | 528/18 |
| 4,244,849 | 1/1981 | Saam | 525/478 |

FOREIGN PATENT DOCUMENTS 862183 1/1971 Canada.
130752 11/1978 Japan.

*Primary Examiner*—Morton Foelak
*Attorney, Agent, or Firm*—Edward C. Elliott

[57] ABSTRACT

This invention describes a method of producing a silicone elastomer from an emulsion. When the ingredients are mixed together, the resulting latex can be used immediately. Removing the water from the latex results in a silicone elastomer. The method combines (A) an anionically stabilized, hydroxyl endblocked polydiorganosiloxane, present as an emulsion of dispersed particles in water, the emulsion having a pH of greater than 9, (B) dialkyltindicarboxylate, (C) alkylorthosilicate, (D) colloidal silica, and optionally (E) water, admixing (A) and (B) only in the presence of (C) to produce a dispersion of the ingredients in water. The ingredients can be distributed into a two-part system for storage. One embodiment includes fibers, lauryl alcohol, or a mixture of both in the emulsion; then forms an open-cell, elastomeric foam by forming a froth from the emulsion and removing the water from the froth.

6 Claims, No Drawings

METHOD OF PRODUCING A SILICONE WATER-BASED ELASTOMER

This is a divisional of co-pending application Ser. No. 830,418 filed on Feb. 18, 1986.

BACKGROUND OF THE INVENTION

1. Field of the Invention

This invention relates to a method of producing a silicone water-based emulsion. After mixing the ingredients, the emulsion is immediately curable to an elastomer by removing the water at room temperature.

2. Background Information

Nelson, in Canadian Pat. No. 862,183, issued Jan. 26, 1971, teaches a silicone emulsion and process for treating fiberglass. His aqueous dispersion consists essentially of a liquid hydroxyl endblocked dimethylsiloxane polymer, a silane of the formula $R_nSiR'_{4-n}$ wherein R is a hydrocarbon or substituted hydrocarbon radical, R' is a hydrolyzable radical other than halogen atoms, and n has a value of 0 or 1, and a siloxane condensation catalyst.

In U.S. Pat. No. 2,843,555, issued July 15, 1958, Berridge teaches a composition of hydroxyl endblocked polydiorganosiloxane, alkyl silicate, and metallic salt of an organic carboxylic acid. The alkyl silicate, which may be unhydrolyzed or hydrolyzed is of the formula

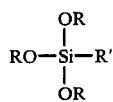

where R' may be OR. On mixing, the products immediately set up. Cure is within one to two hours.

Cekada, in U.S. Pat. No. 3,355,406, issued Nov. 28, 1967, teaches silicone rubber latexes reinforced with a silsesquioxane. In his Example 18, he shows a hydroxyl endblocked polydimethylsiloxane polymer, phenylsilsesquioxane, ethylorthosilicate, and dibutyltindilaurate. The latex was stated to form a fairly strong silicone rubber film when deposited on a surface. The invention is stated as supplying a latex which is stable on storage.

Huebner and Meddaugh, in U.S. Pat. No. 3,706,695, issued Dec. 19, 1972, teach a method of preparing an emulsion which provides a heat stable electrically conductive silicone rubber when the water is removed. According to their method, one emulsifies a hydroxyl endblocked polydiorganosiloxane or polydiorganocyclosiloxane and polymerizes it, then adds carbon black, a metallic salt of a carboxylic acid, and a silane of the formula $RSi(OR')_3$. For long-term storage the emulsion is kept as a two-package system.

Fujiki, in Japanese Kokai No. 53-130752, laid open to public inspection on Nov. 15, 1978, teaches an aqueous emulsion composed of 100 parts by weight of a hydroxyl endblocked polydiorganosiloxane, from 0.5 to 30 parts by weight of silane containing at least 3 silicon-bonded hydrolyzable groups per molecule, curing catalyst, emulsifier, and water. The composition is taught to have excellent storage stability at room temperature and the property of converting to an elastomer by drying at room temperature. Examples of curing catalysts are metal salts of organic acids such as tin salts. There is no teaching concerning use of fillers.

Johnson et al., in U.S. Pat. No. 4,221,688, issued Sept. 9, 1980, teach a silicone emulsion having a dispersed phase of an anionically stabilized hydroxylated polydiorganosiloxane and a colloidal silica and a continuous phase of water in which the pH is 9 to 11.5. Upon removal of the water at ambient conditions an elastomeric product is formed if the emulsion is stored for a period of time, as for 5 months, before the water is removed. Addition of an organic tin compound reduces the required storage time to a few days. The composition of Johnson et al. does not result in an elastomer if the water is removed immediately upon mixing of the ingredients.

Saam, in U.S. Pat. No. 4,244,849, issued Jan. 31, 1981, teaches an aqueous silicone emulsion which provides an elastomeric product upon removal of the water. His emulsion comprises a continuous water phase and an anionically stabilized dispersed silicone phase which is a graft copolymer of a hydroxyl endblocked polydiorganosiloxane, and an alkali metal silicate. An organic tin compound can be employed to accelerate the formation of the graft copolymer. The Saam system does not use colloidal silica as a necessary ingredient.

Laboratory tests have shown that when a silane having 3 hydrolyzable groups is used in a composition containing liquid hydroxyl endblocked polydimethylsiloxane, filler, and dibutyltindilaurate catalyst, the materials did not cure when water was removed if the drying took place immediately after preparation of the mixture. Similar mixtures did not cure where the silane used was a partially hydrolyzed silane such as ethylpolysilicate.

Bengtson, in U.S. Pat. No. 3,830,760, issued Aug. 20, 1984, discloses a process for the manufacture of a foamable composition which comprises forming a mixture of a polymer or polymer precursor, curable on contact with the atmosphere, and a polymer soluble inert blowing agent under pressure. His broad list of polymers includes silicone. His examples show polyurethanes which are mixed and then transferred to aerosol containers. Dispensing the ingredients from the container yields a froth which then cures from exposure to the atmosphere to produce a closed-cell foam.

Patent application, Ser. No. 665,224, filed Oct. 26, 1984, by Gravier and Kalinowski, assigned to the same assignee as the instant application, disclosed the use of fibers in silicone emulsions to stabilize a froth formed by dispersing air throughout the emulsion, then removing the water to yield an open-cell foam.

Patent application, Ser. No. 665,223, filed Oct. 26, 1984, by Bauman, Lee, and Rabe, assigned to the same assignee as the instant application, disclosed a composition, under superatmospheric pressure, consisting of a silicone emulsion, aerosol propellant, and optionally lauryl alcohol and optionally fibers. When released to atmospheric pressure at 25° C., a froth is produced which forms an open-cell, elastomeric foam upon removal of water.

SUMMARY OF THE INVENTION

A method of producing silicone elastomer is disclosed. Combining the ingredients yields an emulsion which can be immediately used to form coatings on substrates or as caulking materials which cure to an elastomer upon removal of the water. The method combines (A) an anionically stabilized, hydroxyl endblocked polydiorganosiloxane, present as an emulsion of dispersed particles in water, the emulsion having a pH of greater than 9, (B) dialkyltindicarboxylate, (C) alkylorthosilicate of the formula $Si(OR')_4$ where R' is a lower alkyl radical of from 1 to 4 carbon atoms inclusive, (D) colloidal silica, (E) optionally additional, water, and (F) optionally fibers and/or lauryl alcohol. The emulsion is made by admixing (A) and (B) only when (C) is present, using sufficient amounts of the ingredients to yield 100 parts by weight of (A), from 0.1 to 2.0 parts by weight of (B), from 1 to 10 parts by weight of (C), from 0 to 100 parts by weight of (D), optionally (E), and optionally from 1 to 10 parts by weight of the fibers of (F) or from 0.2 to 1.5 parts by weight of the lauryl alcohol of (F).

The emulsion of this invention has an extended shelf life because the ingredients are combined just before use. They can be conveniently stored as a two-part emulsion which is combined before use. The emulsion formed by mixing the two parts can be used immediately upon mixing. There is no significant reaction time required between mixing and using, as is necessary in some systems. For instance, an emulsion of anionically stabilized hydroxylated polydiorganosiloxanes and colloidal silica, even in the presence of an organic tin compound, requires a gestation period of several days before the emulsion will yield a cured elastomer upon the removal of the water.

When the method includes the optional addition of fine fibers or lauryl alcohol or a mixture thereof, the combination can be stored as a two-part emulsion which can be mixed together, then immediately formed into a froth, either mechanically or through an aerosol means. By removing water from the froth, an open-cell, elastomeric foam is produced.

DESCRIPTION OF THE INVENTION

This invention relates to a method of producing a silicone elastomer which is derived from ingredients comprising (A) 100 parts by weight of an anionically stabilized, hydroxyl endblocked polydiorganosiloxane having a weight average molecular weight of above 50,000, the organic radicals being monovalent hydrocarbon radicals o containing less than seven carbon atoms per radical or 2-(perfluoroalkyl)ethyl radicals having less than seven carbon atoms per radical, present as an emulsion of dispersed particles in water, the emulsion having a pH of greater than 9, (B) from 0.1 to 2.0 parts by weight of dialkyltindicarboxylate, (C) from 1 to 10 parts by weight of alkylorthosilicate of the formula $Si(OR')_4$ where $R'$ is a lower alkyl radical of from 1 to 4 carbon atoms inclusive, (D) from 0 to 100 parts by weight of colloidal silica, (E) optionally additional water, and (F) optionally from 1 to 10 parts by weight of fibers having a diameter of from 1 to 10 micrometers and a length of from 30 micrometers to 10 millimeters with a length to diameter ratio of greater than 10 to 1, or from 0.2 to 1.5 parts by weight of lauryl alcohol, or mixtures thereof, consisting essentially of admixing the ingredients such that (A) and (B) are mixed only when (C) is present, to produce an emulsion of the ingredients dispersed in water, which emulsion can be used immediately without a gestation period; and removing the water to produce the silicone elastomer.

A current commercial method of producing an aqueous silicone emulsion which, when dried, produces an elastomer comprises an anionically stabilized hydroxylated polydiorganosiloxane and colloidal silica. This emulsion must age, for example for 5 months, before an elastomer is formed upon drying the emulsion. When this emulsion also contains an organic tin compound as a catalyst, the aging period is reduced to a matter of several days, greater than 3 days for example. The properties of the elastomer formed by drying the emulsion are a function of the age of the emulsion also. As the emulsion ages, the elongation, in particular, decreases. The variability of the elastomer's elongation because of the age of the emulsion at the time of use, prohibits the use of the emulsion in applications which require a specific elongation.

A two-part emulsion produced by the method of this invention does not change properties on shelf aging. The emulsion can be formulated to yield an elastomer having a given range of properties. The two parts can then be shelf aged with no effect. When the two parts are mixed together and the emulsion is dried, the elastomer produced will have the physical properties for which it was formulated. An additional advantage is the ability of the emulsion to be used immediately upon mixing; there is no waiting period necessary. The mixed emulsion has a pot life of several days after mixing before it will begin to show a change of properties. At that time, the emulsion will have an appreciably increased viscosity when compared to its viscosity immediately after mixing.

A method of producing silicone open-cell, elastomeric foam from the two-part emulsion is disclosed. The method consists essentially of (1) mixing Part I and Part II to produce an emulsion of the ingredients dispersed in water, (2) immediately forming a froth of the mixture, then (3) immediately removing water from the froth to produce a foam. In this embodiment, Part I consists essentially of 100 parts of (A), from 1 to 10 parts of (D), and (F) from 1 to 10 parts by weight of fibers having a diameter of from 1 to 10 micrometers and a length of from 30 micrometers to 10 millimeters with a length to diameter ratio of greater than 10 to 1, or from 0.2 to 1.5 parts by weight of lauryl alcohol, or mixtures thereof. Part II consists essentially of from 0.1 to 2.0 parts by weight of (B), from 1 to 10 parts by weight of (C), and from 15 to 35 parts by weight of (D).

The anionically stabilized, hydroxyl endblocked polydiorganosiloxane emulsion used in this invention is a known material. The hydroxyl endblocked polydiorganosiloxane (A) is one which can be emulsified, which imparts elastomeric properties to the product obtained after the removal of the water from the emulsion, and which is anionically stabilized. Tensile strengths and elongations at break improve with increasing weight average molecular weight(Mw), with suitable tensile strengths and elongations obtained above 50,000 Mw. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals including 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes.

The preferred anionically stabilized, hydroxyl endblocked polydiorganosiloxanes are those prepared by the method of anionic emulsion polymerization described by Findlay et al. in U.S Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes, the ingredients used, and their method of preparation. These methods and others are known in the art. The hydroxyl endblocked polydiorganosiloxanes used in this invention are those which are anionically stabilized. For the purpose of this invention "anionically stabilized" means the hydroxyl endblocked polydiorganosiloxane is stabilized in emulsion with an anionic surfactant. This silicone emulsion is in the form of an oil-in-water emulsion, i.e., the polydiorganosiloxane is a dispersed phase of particles in a continuous phase of water.

Ingredient (B) is dialkyltindicarboxylate. The dialkyltindicarboxylates are commercial materials. Preferred dialkyltindicarboxylates include dibutyltindiacetate, dibutyltindilaurate, and dioctyltindilaurate with dibutyltindilaurate most preferred. The dialkyltindicarboxylate can be used as is or it can be made into an emulsion. A suitable emulsion is produced by emulsifying 50 percent by weight of the dialkyltindicarboxylate with water using about 10 percent by weight of sodium alkylarylpolyether sulfonate as the emulsifying agent in any of the well known methods of producing oil-in-water emulsions.

Ingredient (C) is alkylorthosilicate. The alkylorthosilicate of the formula $Si(OR')_4$ is a commercially available material. R' is a lower alkyl radical of from 1 to 4 carbon atoms such as methyl, ethyl, propyl, isopropyl, and butyl. The preferred radicals are ethyl and normal propyl. The silicate used in this invention is not a polymerized material such as ethylpolysilicate, which was found not usable in this invention. Materials such as methyltrimethoxysilane and phenyltrimethoxysilane were also found not usable because emulsions made with these materials did not cure upon removal of the water.

Ingredient (D) is colloidal silica. Finely divided colloidal silicas are those capable of being dispersed in the polydiorganosiloxane emulsion. The common forms of colloidal silica are commercially available a colloidal silica dispersions in water, as dry powders of fumed silica or precipitated silica, and the mined amorphous silicas that are known as diatomaceous earth. Preferred are the commercially available colloidal silica sols which are sodium stabilized, having a pH of greater than 10. These are sols of colloidal silica having surface areas varying from about 150 $m^2/g$ to about 750 $m^2/g$ and having solids contents from about 15 percent to 50 percent in water. The colloidal silica acts as a reinforcing agent to give improved physical properties.

The method of this invention produces a silicone elastomer by removing the water from an emulsion produced by combining ingredients (A), (B), (C), and optionally (D) in the amounts specified above. When combining the ingredients, the polydiorganosiloxane (A) is mixed with the dialkyltindicarboxylate (B) only when the alkylorthosilicate (C) is present. Immediately after mixing (A), (B), and (C), an elastomer can be formed by removal of the water. The water can be removed at room temperature merely by exposing a layer of the mixture of (A), (B), and (C) to the atmosphere and allowing the water to evaporate. The time required for removal of the water is dependent upon the thickness of the emulsion layer. The evaporation rate can be increased by raising the temperature or reducing the pressure or relative humidity of the atmosphere to which the emulsion is exposed. The elastomer obtained from (A), (B), and (C) is relatively weak because it contains no reinforcement. The addition of colloidal silica (D) results in an elastomer having improved physical properties, especially tensile strength and elongation.

The method of this invention can be conveniently practiced by combining the ingredients into two parts, Part I and Part II, and storing them as a two-part system. Part I and Part II are then combined at the time of use. In order for the latex produced by admixing Part I and Part II, according to the method of this invention, to be capable of being stored for long periods of time with no or little change of the properties of the elastomer produced, it is necessary that the polydiorganosiloxane (A) and the dialkyltindicarboxylate (B) are stored in separate parts. The other ingredients, (C) and (D) that are used in the latex can be stored in any combination in either or both of Part I and Part II.

Preferred combinations are Part I consisting essentially of (A) and Part II consisting essentially of (B), (C), and (D); Part I consisting essentially of (A) and (C) and Part II consisting essentially of (B) and (D); Part I consisting essentially of (A) and (D) and Part II consisting essentially of (B) and (C); Part I consisting essentially of (A), (C), and (D) and Part II consisting essentially of (B). Most preferred are combinations where Part I consists essentially of (A) and (C) and Part II consists essentially of (B) and (D), and where Part I consists essentially of (A) and (D) and Part II consists essentially of (B) and (C).

The amounts of ingredients used in Part I and in Part II and the amount of Part I and Part II admixed together in the method of this invention are such that the amount of ingredients in the latex produced by the method are within the correct ranges. The amounts are based upon 100 parts by weight of the hydroxyl endblocked polydiorganosiloxane (A). The amount of dialkyltindicarboxylate (B) can vary from 0.1 to 2.0 parts by weight with the preferred amount being from 0.25 to 0.75 parts by weight. The amount of colloidal silica (D) can vary from 0 to 100 parts by weight with the preferred amount being from 1 to 50 parts by weight and most preferred from 5 to 50 parts by weight. The higher amounts of colloidal silica tend to give a higher hardness, higher tensile strength, and lower elongation to the elastomer produced. The amount of alkylorthosilicate (C) can vary from 1 to 10 parts by weight. The preferred amount is from 2 to 6 parts by weight where the organic radical is either ethyl or propyl.

A preferred method of this invention admixes 100 parts of anionically stabilized, hydroxyl endblocked polydiorganosiloxane having a weight average molecular weight of greater than 200,000 in the form of an oil-in-water emulsion having a pH of greater than 9 and from 5 to 50 parts by weight of colloidal silica in the form of a sodium stabilized colloidal silica dispersion in water and thickening agent to give Part I, the mixture having a pH of greater than 10. Part II is produced by admixing from 0.25 to 0.75 part by weight of dibutyltindilaurate and from 2 to 6 parts by weight of either ethylorthosilicate or normal propylorthosilicate. The Part I and Part II are stored separately until ready for use, then are combined to form a reinforced silicone elastomeric latex. Sufficient thickener is used in Part I to give the latex a viscosity of greater than 25 Pa.s at 25° C. The solids contents of the emulsions used should be chosen so that the latex preferably has a solids content of greater than 45 percent by weight, that is, the water content of the latex is less than 55 percent by weight.

Another preferred method of this invention admixes 100 parts of anionically stabilized, hydroxyl endblocked polydiorganosiloxane having a weight average molecular weight of greater than 200,000 in the form of an oil-in-water emulsion having a pH of greater than 9, from 2 to 6 parts by weight of either ethylorthosilicate or normal propylorthosilicate, and thickening agent to give Part I. Part II is produced by admixing from 0.25 to 0.75 part by weight of dibutyltindilaurate, and from 5 to 50 parts by weight of colloidal silica in the form of a sodium stabilized colloidal silica dispersion in water to give Part II, having a pH of greater than 10. Part I and Part II are stored separately until ready for use, then are combined to form a reinforced silicone elastomeric latex. Sufficient thickener is used in Part I to give the latex a viscosity of greater than 25 Pa.s at 25° C. The solids content of the emulsions used should be chosen so that the latex preferably has a solids content of greater than 45 percent by weight.

When the ingredients are mixed together, the resulting final latex will form a silicone elastomer upon removal of the water. The properties of the elastomer can be modified by other ingredients which are added to the emulsions, either into Part I or Part II or into their mixture, provided that the additional ingredients do not adversely effect the usefulness of the elastomer produced by removing the water from the latex resulting from mixing of the ingredients according to the method of this invention. Additives include additional emulsifiers and optionally water, other fillers such as ground quartz or calcium carbonate, heat stability additives such as iron oxide, pigments, and thickening agents. Fillers can be used to reduce the cost per unit of the elastomeric product or to make the emulsion useful as a caulking material. Thickening agents are useful for increasing the working viscosity of the silicone emulsion to provide a material which can be used to coat a substrate with a film of elastomeric product. Suitable thickeners are available commercially and would be selected for their stability and usability at a pH of 10 or greater. Useful thickeners include the classes of cellulose derivatives, alkali salts of polyacrylates and polymethylacrylates, sodium and ammonium salts of carboxylate copolymers and colloidal clays. The preferred thickeners are the sodium salts of polyacrylates. Emulsifiers and water can be used to aid in the emulsification and mixing of the ingredients. For example, the dialkyltindicarboxylate is preferrably used as an emulsion. The preferred colloidal silica is a colloidal silica sol in water, but dry powders of colloidal silica can be dispersed in water.

The silicone latex produced by the method of this invention can contain the required ingredients over a wide range of concentrations to make useful products. Emulsions which have a low solids content can be used for imparting a property such as water repellency to a substrate such as cloth or paper by coating the substrate and drying it. Latexes of solids contents such as above 45 percent by weight can be used to provide thicker elastomeric films in coating applications such as roof coatings. When thicker coatings such as roof coatings are desired, it is also preferred to have latex viscosity of greater than 25 Pascal seconds at 25° C. Latexes having solids content above about 45 percent by weight and a viscosity of greater than about 25 Pascal seconds produce continuous, crack free dried films when applied to a substrate in a wet thickness on the order of 1.5 mm. Latexes having solids contents and viscosities below these values tend to crack upon drying when applied a this thickness. Latexes having a solids content and viscosity sufficiently high to produce paste-type material are useful as caulking material. The solids content is the percent of non-volatile material remaining in a 2 gram sample of the emulsion after it has been heated for 1 hour at 150° C. in an air circulating oven. The sample is in an aluminum foil dish 60 mm in diameter and 15 mm deep.

An embodiment of the method of this invention can be used to produce open-cell, elastomeric silicone foam. A foamable composition is produced by mixing Part I and Part II, immediately forming a froth of the mixture, then immediately removing water from the froth to produce an open-cell, elastomeric silicone foam. A preferred Part I consists essentially of 100 parts of (A) (the hydroxyl endblocked polydiorganosiloxane described above), 1 to 10 parts by weight of (D) (the colloidal silica sol described above), and (F) (from 1 to 10 parts by weight of the fibers or from 0.2 to 1.5 parts of lauryl alcohol or mixtures thereof). A preferred Part II consists essentially of from 0.1 to 2.0 parts of (B) (the dialkyltindicarboxylate described above), from 1 to 10 parts by weight of (C) (the alkylorthosilicate described above) and from 15 to 30 parts by weight of (D) (the colloidal silica described above).

The fibers or the lauryl alcohol, or mixtures thereof, are used to reinforce the walls of the cells formed when the froth is formed so that the froth is stable, i.e. the froth does not collapse. The fibers used are fibers which are not adversely effected by the aqueous emulsion. The fibers are more successfully dispersed into the emulsion if the average diameter is less than 10 micrometers and their length is less than 10 mm, preferably the diameter is less than 5 micrometers and the length is less than 8 mm. The smaller the diameter of the fibers and the shorter they are, the easier they are to disperse. Glass fibers having a diameter of about 3 micrometers and an average length of about 4 mm are preferred. The minimum diameter of useful fibers is about 1 micrometer and the minimum length of useful fibers is about 20 micrometers. Electrically conductive foams may be produced by using graphite fibers and graphite fibers coated with metal, such as nickel. A preferred range of fibers is from 4 to 8 parts of fiber per 100 parts by weight of (A).

It is believed that the fibers act as a froth stabilizer in that they reinforce the walls of the cells as the froth is formed. The reinforced cell walls do not collapse as the froth is dried, so that a foam is formed by drying the stabilized froth. The fibers also act as a reinforcement in the foam cell walls so that the foam is stiffer and tougher than when the fibers are not present.

Lauryl alcohol also has been found to thicken the mixture of Part I and Part II and to stabilize the froth produced. The lauryl alcohol tends to produce smaller cells and a softer foam. Lauryl alcohol has been found to be unique in its ability to produce a uniform, small-celled froth. Mixtures of the fibers and the lauryl alcohol can be used to produce foam. A preferred combination is from 4 to 8 parts by weight of the fibers and from 0.5 to 1.0 part by weight of lauryl alcohol, based upon 100 parts by weight of (A).

The mixture of Part I and Part II can be formed into a froth by mechanical means such as rapid stirring to whip in air, or by bubbling air or other gas through the mixture to create a froth. The froth can be generated by using the known, commercial machines used to produce mechanical foams.

The mixture of Part I and Part II can be formed into a froth by adding an aerosol propellant under superatmospheric pressure into the mixture after the mixture is placed into an aerosol container. From 1 to 20 parts by weight of an aerosol propellant selected from the group consisting of isobutane, propane, dichlorodifluoromethane, trichlorofluoromethane and mixtures thereof is added to the mixture in a aerosol propellant and mixed in. Discharging the mixture from the container into a space at atmospheric pressure forms a froth because of the expansion of the aerosol propellant in the mixture. Because of the presence of (F), the froth is stable. The water is then removed from the stable froth to form an open-celled, elastomeric silicone foam. There is no gestation period required in this method. The mixture can be produced and used immediately to form the froth and dried immediately to form a foam.

The aerosol propellant can be added to Part I in a first aerosol container, and to Part II in a second aerosol container. The two can be stored in this form, then combined when it is desired to produce a foam. The mixture of first aerosol container and the mixture of second aerosol container are combined in third container and mixed while still under superatmospheric pressure. After mixing, the combined mixture is then immediately discharged into a space at atmospheric pressure to form a stable froth. Removing the water from the froth produces a foam.

A foam can also be produced in a continuous manner, as in a factory situation, by pumping the ingredients of Part I into an aerosol container, pumping the ingredients of Part II into a second aerosol container, mixing the ingredients in each container, and continuously pumping the mixed ingredients into a third container when Part I and Part II are mixed. The rate into and out of the containers are adjusted to maintain the ratio of ingredients shown above. The mixture from the third container is continuously discharged to a space at atmospheric pressure, forming a stable froth in a continuous manner. The water is continuously removed from the froth to form a foam.

The stable froth produced by any of the above embodiments can have the water removed by any suitable method, such as drying at room temperature, drying at elevated temperature, drying in a microwave oven, or by freezing the froth, then thawing and removing the water by drying at room temperature. The method of removing the water is not critical because the froth is stable enough to maintain itself as the water is removed because of the composition used to form the froth.

The method of this embodiment produces an open-cell, elastomeric silicone foam which has good heat stability and weatherability when compared to organic-based foams. The foam is useful as insulation cushioning, lightweight gap filler, and lightweight sealant. When electrically conductive fibers are used, particularly when carbon black is added to the formulation, the foam can be used as electrical connectors or pressure switches.

The following examples are presented for purposes of illustrating the invention and should not be construed as limiting the scope of the invention which is properly delineated in the claims. All parts are parts by weight.

EXAMPLE 1

A two-part silicone elastomeric emulsion system was prepared.

Part I was an emulsion polymerized hydroxyl endblocked polydimethylsiloxane having a weight average molecular weight of about 325,000. The emulsion was prepared by mixing 54 parts of water, 100 parts of low molecular weight linear hydroxyl-endblocked polydimethylsiloxane, and 4 parts of a surfactant consisting of 30 percent sodium lauryl sulphate. This mixture was homogenized, then mixed with 1 part of dodecylbenzene sulfonic acid and allowed to polymerize. After polymerization, the emulsion was made basic by admixing 0.5 part of 50 percent aqueous diethylamine. The emulsion had a pH of approximately 10 and a solids content of about 63 percent by weight.

Part II was prepared by mixing 5 parts of ethylorthosilicate and 0.5 part of dibutyltindilaurate.

An emulsion capable of curing at room temperature immediately after preparation was then prepared by mixing Part I and Part II. Immediately after mixing, the resulting emulsion was de-aired, then poured into a chase to give a wet sample with a thickness of 1.5 mm. After 7 days at 77° F. and 50% relative humidity during which time the sample cured and dried, the elastomeric film was tested for physical properties in accordance with ASTM D412 for tensile strength at break and elongation at break and with ASTM D624 die B for tear strength. The nonreinforced elastomer, which did not contain colloidal silica, had a tensile strength of 0.25 MPa, elongation of 253 percent, and tear strength of 1.75 kN/M.

EXAMPLE 2

A two-part silicone elastomeric emulsion system having reinforcing filler present was prepared.

A mixture (Part I) was prepared by mixing in a beaker with an air motor, 100 parts of a dispersion of colloidal silica in water having 15 percent by weight colloidal silica, 2 parts of diethylamine, 172 parts of the polydimethylsiloxane emulsion of Example 1 and 0.3 part of a silicone antifoam emulsion having 30 percent by weight active ingredient. The mixture had a pH of greater than 10. A mixture (Part II) was prepared by mixing 5 parts of normal-propylorthosilicate and 0.5 part of dibutyltindilaurate.

Parts I and II were then combined and mixed thoroughly. The mixture was deaired, then formed into a test sample as in Example 1. The test sample was formed within 1 hour of the initial mixing of Part I and Part II. After curing and testing as in Example 1, the results were a tensile strength of 1.43 MPa, elongation of 225 percent, and tear strength of 11.7 kN/m.

EXAMPLE 3

Different crosslinking agents were evaluated.

Part I was prepared as in Example 2 except 9 parts of an emulsion of an acrylic thickening agent having 30 percent by weight solids was added as a last step.

Each Part II was prepared by mixing 5 parts of the crosslinking agent shown in Table I below with 0.5 part of dibutyltindilaurate. Parts I and II were then mixed, deaired, formed in test samples, cured, and tested as in Example 1. The results are shown in Table I.

The results show that this invention only cures properly when the crosslinker is an alkylorthosilicate.

TABLE I

| Crosslinker | Tensile Strength MPa | Elongation Percent | Tear Strength kN/m |
|---|---|---|---|
| normal-propylorthosilicate | 3.14 | 548 | 21.2 |
| ethylpolysilicate* | no cure | | |
| methyltrimethoxysilane* | no cure | | |
| phenyltrimethoxysilane* | no cure | | |
| 3-(2-aminoethylamino)* propyltrimethoxysilane | no cure | | |

*Comparative example

EXAMPLE 4

A series of two part emulsions were prepared containing varying amounts and types of alkylorthosilicate crosslinker and varying amounts of dibutyltindilaurate catalyst.

Part I was prepared as in Example 3.

Part II was prepared by mixing the type and amount of silicate shown in Table II below with the amount of catalyst shown. Comparative examples using alkylpolysilicate were also prepared.

Parts I and II were then mixed, de-aired, formed in test samples, cured and tested as in Example 1. The results are shown in Table II. The minimum amount of catalyst necessary to produce a cure is dependent upon the alkylorthosilicate used.

TABLE II

| Silicate | Amount | Catalyst Amount | Tensile Strength MPa | Elongation percent |
|---|---|---|---|---|
| ethylpolysilicate* | 3 | 1.0 | No Cure | |
| ethylpolysilicate* | 5 | 0.5 | No Cure | |
| ethylpolysilicate* | 5 | 1.0 | No Cure | |
| ethylorthosilicate | 3 | 1.0 | 3.00 | 725 |
| ethylorthosilicate | 5 | 0.25 | No Cure | |
| ethylorthosilicate | 5 | 0.5 | 3.56 | 860 |
| ethylorthosilicate | 5 | 0.75 | 3.17 | 750 |
| ethylorthosilicate | 5 | 1.0 | 2.86 | 610 |
| normal propylorthosilicate | 3 | 0.25 | 1.65 | 300 |
| | 3 | 0.5 | 4.41 | 830 |
| | 3 | 1.0 | 4.13 | 740 |
| | 5 | 0.0 | No Cure | |
| | 5 | 0.25 | 2.48 | 590 |
| | 5 | 0.5 | 4.20 | 775 |
| | 5 | 1.0 | 3.96 | 760 |

*Comparative example

EXAMPLE 5

A comparative example composition was prepared to illustrate the necessity of the alkylorthosilicate.

A composition was prepared as in Part I of Example 2. To this was added 0.5 part of dibutyltindilaurate catalyst. Samples of the catalyzed composition were tested for properties as in Example 1, preparing a sample after aging the catalyzed composition for the time periods shown below before preparation of the sample for test. The results show that the composition does not yield a curable product until the composition has aged for a period of at least 5 days. Optimum properties are not reached until aging at least 9 days after catalyzation before sample preparation.

| Days Aging | Tensile Strength MPa | Elongation Percent |
|---|---|---|
| 0 | No Cure | |
| 1 | No Cure | |
| 2 | No Cure | |
| 3 | No Cure | |
| 4 | No Cure | |
| 5 | 0.62 | 30 |
| 7 | 0.76 | 50 |
| 9 | 1.17 | 155 |

EXAMPLE 6

The shelf life of the two-part composition was evaluated.

Two embodiments of a Part I were prepared by mixing 172 parts of the polydimethylsiloxanes emulsion of Example 1, 10 parts of the thickening agent of Example 3, and either 3 parts or 5 parts of normal propylorthosilicate together to produce homogeneous emulsions.

Two embodiments of a Part II were prepared by mixing 100 parts of the colloidal silica emulsion of Example 2 (15 parts of silica) with either 0.25 part or 0.5 part of dibutyltindilaurate Portions of the two embodiments of Part I were mixed with the two embodiments of Part II to give the parts of normal-propylorthosilicate and dibutyltindilaurate shown below in Table III. The 4 mixtures were used to prepare samples as in Example 1. The samples were tested as in Example 1 with the results shown in Table III.

The remaining portions of the emulsions were aged at 23° C. for 6 months in sealed containers. Then they were mixed together, made into test samples and tested as before. The results are shown in Table III.

TABLE III

| Sample | A | B | C | D |
|---|---|---|---|---|
| Normal-propylorthosilicate, parts | 3 | 3 | 5 | 5 |
| Dibutyltindilaurate, part | 0.25 | 0.5 | 0.25 | 0.5 |
| Physical properties, after manufacture | | | | |
| Tensile Strength, MPa | 2.55 | 2.76 | 2.69 | 2.46 |
| Elongation, percent | 739 | 748 | 624 | 633 |
| Tear Strength, kN/m | 20.0 | 17.5 | 17.7 | 17.5 |
| Durometer, Shore A | 52 | 52 | 60 | 59 |
| Physical properties, after aging Parts A and Part B for 6 months | | | | |
| Tensile Strength, MPa | 2.78 | 2.68 | 2.83 | 2.60 |
| Elongation, percent | 687 | 717 | 707 | 657 |
| Tear Strength, kN/m | 18.7 | 16.3 | 17.2 | 17.3 |
| Durometer, Shore A | 48 | 57 | 54 | 51 |

EXAMPLE 7

A series of compositions was prepared to evaluate the usefulness of various colloidal silica emulsions.

Six embodiments of a Part I were prepared using three different colloidal silica emulsions at two different amounts each. Colloidal silica A was a sol having 15 percent by weight of colloidal silica having a surface area of about 750 m²/g in water. Colloidal silica B was similar but was 30 percent by weight of a colloidal silica having a surface area of about 375 m²/g. Colloidal silica C was similar but was 50 percent by weight of a colloidal silica having a surface area of about 150 m²/g.

Each of the six emulsions was prepared by mixing together the amount of colloidal silica solution shown in Table IV, 2 parts of diethylamine, 172 parts of the polydid not produce crack free films. The physical property valves shown for the films having cracks were obtained by carefully cutting the test pieces so that they contained a minimum number of flaws. The viscosity is felt to be the most important of these variables in obtaining good films upon drying and curing the emulsion.

TABLE IV

| Run | 1 | 2 | 3 | 4 | 5 | 6 | 7 | 8 | 9 | 10 | 11 | 12 |
|---|---|---|---|---|---|---|---|---|---|---|---|---|
| Colloidal Silica A | 67 | 67 | 67 | 67 | 100 | 100 | 100 | 100 | | | | |
| Colloidal Silica B | | | | | | | | | 33.3 | 33.3 | 33.3 | 33.3 |
| Normal-propyl-orthosilicate | 3 | 5 | 3 | 5 | 3 | 5 | 3 | 5 | 3 | 5 | 3 | 5 |
| Dibutyltindilaurate | 0.25 | 0.5 | 0.5 | 0.25 | 0.25 | 0.5 | 0.5 | 0.25 | 0.25 | 0.5 | 0.5 | 0.25 |
| Viscosity, Pa·s | 15 | 15 | 15 | 15 | 10 | 0 | 10 | 10 | 35 | 30 | 32 | 35 |
| Film Rating | 6 | 3 | 8 | 5 | 3 | 3 | 2 | 4 | 10 | 10 | 10 | 10 |
| Solids Content, Percent | 48 | 48 | 48 | 48 | 44 | 44 | 44 | 44 | 56 | 56 | 56 | 56 |
| Silica Content, Parts | 10 | 10 | 10 | 10 | 15 | 15 | 15 | 15 | 10 | 10 | 10 | 10 |
| Tensile Strength, MPa | 1.77 | 1.58 | 1.86 | 2.62 | 2.55 | 1.07 | 1.9 | 1.55 | 2.82 | 1.63 | 1.61 | 1.54 |
| Elongation, Percent | 793 | 702 | 740 | 793 | 660 | 53 | 550 | 983 | 620 | 873 | 1097 | 710 |

| Run | 13 | 14 | 15 | 16 | 17 | 18 | 19 | 20 | 21 | 22 | 23 | 24 |
|---|---|---|---|---|---|---|---|---|---|---|---|---|
| Colloidal Silica B | 33.3 | 66.7 | 66.7 | 66.7 | | | | | | | | |
| Colloidal Silica C | | | | | 30 | 30 | 30 | 30 | 60 | 60 | 60 | 60 |
| Normal-propyl-orthosilicate | 3 | 5 | 3 | 5 | 3 | 5 | 3 | 5 | 3 | 5 | 3 | 5 |
| Dibutyltindilaurate | 0.25 | 0.5 | 0.5 | 0.25 | 0.25 | 0.5 | 0.5 | 0.25 | 0.25 | 0.5 | 0.5 | 0.25 |
| Viscosity, Pa·s | 18 | 18 | 18 | 18 | 72 | 70 | 70 | 78 | 68 | 60 | 65 | 75 |
| Film Rating | 1 | 1 | 2 | 1 | 10 | 10 | 10 | 10 | 10 | 10 | 10 | 10 |
| Solids Content, Percent | 52.3 | 52.3 | 52.3 | 52.3 | 59 | 59 | 59 | 59 | 58 | 58 | 58 | 58 |
| Silica Content, Parts | 20 | 20 | 20 | 20 | 15 | 15 | 15 | 15 | 30 | 30 | 30 | 30 |
| Tensile Strength, MPa | — | 1.53 | 1.58 | 0.86 | 1.31 | 1.45 | 1.83 | 0.90 | 2.74 | 3.03 | 1.46 | 2.85 |
| Elongation, Percent | — | 415 | 400 | 150 | 815 | 647 | 1058 | 807 | 1097 | 943 | 577 | 840 |

| Part I | | Part II | |
|---|---|---|---|
| Polydiorgano-siloxane Emulsion | 172 parts by weight | Normal-propyl-orthosilicate | as shown above |
| Antifoam | 0.5 | Dibutyltindilaurate | as shown above |
| Acrylic Thickener | 5 | | |
| Diethylamine | 2 | | |
| Colloidal Silica | as shown above | | | dimethylsiloxane emulsion of Example 1, and 0.5 part of the antifoam of Example 2. Each had a pH of greater than 10.

Four embodiments of a Part II were prepared by mixing together the amounts of normal-propylorthosilicate and dibutyltindilaurate shown in Table IV.

Each embodiment of Part I was then mixed with each of the embodiments of Part II as shown in Table IV, giving a total of 24 mixtures. The viscosity of each mixture was measured at room temperature with the results shown in Table IV. Each mixture was then prepared into a test sample, dried, and cured, then tested as in Example 1. The results are shown in Table IV.

The quality of the films obtained upon curing was observed and judged with the results shown in Table IV, using a scale from 1 to 10. A rating of 1 means the film had severe shrink cracking with large open fissures. A rating of 5 was heavy check cracking. A rating of 10 was crack free. It can be seen that the mixtures with the highest viscosities and solids contents produced the best films. Those mixtures having a solids content of below about 55 percent and a viscosity of below about 25 Pa.s

EXAMPLE 8

A two-part composition useful in producing foam was prepared.

Part I was prepared by mixing together 13.67 g of the colloidal silica dispersion of Example 2 (15 percent by weight silica), 3.0 g of a 50 percent by weight solution of diethylamine, 290.19 g of the emulsion polymerized hydroxyl endblocked polydimethylsiloxane (58 percent by weight polymer) of Example 1, 9.08 g of glass fibers having a diameter of about 2.6 to 3.8 micrometers and a length of less than 8 mm with an average length of about 4 mm, 1.51 g of lauryl alcohol, and 3.07 g of a 30 percent by weight acrylic thickener solution. This composition had a solids content of about 58 percent by weight.

Part II was prepared by mixing 8.51 g of normal-propylorthosilicate, 1.06 g of a 50 percent by weight solution of dibutyltindilaurate, 192.1 g of the colloidal silica dispersion in Part I above, 8.58 g of a 35 percent by weight solution of disodium N-octadecylsulfosuccinamate, and 6 g of the acrylic thickener solution of Part I above.

Part I and Part II were combined in a mixer and mixed until uniform. A 75 g portion was removed and placed into an aerosol container and a valve applied. The container was charged with 6 ml of isobutane propellant and then shook to mix the propellant with the emulsion. The remainder of the emulsion was mechanically frothed by mixing rapidly in the mixer (a kitchen-type mixer having vertical beaters) for 10 minutes until sufficient air was beaten into the mixture to give a froth. The froth was then transferred to paper cups and cured by removing the water. The first cup was allowed to dry at room temperature. The second cup was frozen for 24 hours at 0° F., then dried at 70° F. for 4 days. The third cup was placed in a microwave oven set at low heat for 15 minutes.

The emulsion in the aerosol container was discharged into 3 cups, forming a froth upon discharge. These 3 cups of froth were cured in the same manner as described above for the mechanically formed froths.

Each of the cups of cured froth contained an open-cell, elastomeric foam. Samples of the foams were cut out and weighed to determine their density. The results are shown in Table IV.

TABLE IV

| Cure | Density, kg/m$^3$ | |
|---|---|---|
| | Mechanically Formed Foam | Aerosol Formed Foam |
| room temperature | 134 | 61 |
| freeze, thaw | 67 | 170 |
| microwave | 51 | 37 |

When compositions similar to this were prepared without the glass fiber and the lauryl alcohol to stabilize the froth so that it could be cured, the froth collapsed during cure at room temperature so that a foam was not obtained.

That which is claimed is:

1. A method of producing an open-cell, elastomeric foam consisting essentially of
    (1) mixing in a first aerosol container under superatmospheric pressure, a composition consisting essentially of (A) 100 parts by weight of an anionically stabilized, hydroxyl endblocked polydiorganosiloxane having a weight average molecular weight of above 50,000, the organic radicals being monovalent hydrocarbon radicals containing less than seven carbon atoms per radical or 2-(perfluoroalkyl)ethyl radicals having less than seven carbon atoms per radical, present as an emulsion of dispersed particles in water, the emulsion having a pH of greater than 9; (D) from 1 to 10 parts by weight of colloidal silica, (F) optionally from 1 to 10 parts by weight of fibers having a diameter of from 1 to 10 micrometers and a length of from 30 micrometers to 10 millimeters with a length to diameter ratio of greater than 10 to 1, or from 0.2 to 1.5 parts by weight of lauryl alcohol, or mixtures thereof; and from 1 to 20 parts by weight of an aerosol propellant selected from the group consisting of isobutane, propane, dichlorodifluoromethane, trichlorofluoromethane, and mixtures thereof,
    (2) mixing in a second aerosol container under superatmospheric pressure, a composition consisting essentially of (B) from 0.1 to 2.0 parts by weight of dialkyltindicarboxylate; (C) from 1 to 10 parts by weight of alkylorthosilicate of the formula Si(OR')$_4$ where R' is a lower alkyl radical of from 1 to 4 carbon atoms inclusive; (D) from 15 to 35 parts parts by weight of colloidal silica; and from 1 to 20 parts by weight of an aerosol propellant selected from the group consisting of isobutane, propane, dichlorodifluoromethane, trichlorofluoromethane, and mixtures thereof,
    (3) discharging the mixture of the first and second aerosol containers into a third mixing container under superatmospheric pressure at rates which maintain the ratio of ingredients shown in (2), and mixing the contents of the third container,
    (4) immediately discharging the mixture of step (3) into a space at atmospheric pressure to form a froth, then
    (5) immediately removing water from the froth to form a foam.

2. A method of producing an open-cell, elastomeric foam consisting essentially of
    (1) mixing Part I consisting easentially of (A) 100 parts by weight of an anionically stabilized, hydroxyl endblocked polydiorganosiloxane having a weight average molecular weight of above 50,000, the organic radicals being monovalent hydrocarbon radicals containing less than seven carbon atoms per radical or 2-(perfluoroalkyl)ethyl radicals having less than seven carbon atoms per radical, present as an emulsion of dispersed particles in water, the emulsion having a pH of greater than 9; (D) from 1 to 10 parts by weight of colloidal silica; and (F) optionally from 1 to 10 parts by weight of fibers having a diameter of from 1 to 10 micrometers and a length of from 30 micrometers to 10 millimeters with a length to diameter ratio of greater than 10 to 1, or from 0.2 to 1.5 parts by weight of lauryl alcohol, or mixtures thereof; and Part II consisting essentially of (B) from 0.1 to 2.0 parts by weight of dialkyltindicarboxylate; (C) from 1 to 10 parts by weight of alkylorthosilicate of the formula Si(OR')$_4$ where R' is a lower alkyl radical of from 1 to 4 carbon atoms inclusive; and (D) from 15 to 35 parts weight of colloidal silica,
    (2) placing (1) into an aerosol container,
    (3) adding to (2) from 1 to 20 parts by weight of an aerosol propellant selected from the group consisting of isobutane, propane, dichlorodifluoromethane, trichlorofluoromethane, and mixtures thereof to the contents of the aersol container and mixing,
    (4) discharging the mixture of step (3) into a space at atmospheric pressure to form a froth, then
    (5) removing water from the froth to form an open-cell foam, the method not requiring any gestation period.

3. The composition contained in the first aerosol container produced in accordance with claim 1.

4. The composition contained in the second aerosol container produced in accordance with claim 1.

5. The cured silicone elastomeric foam resuliting from the method of claim 1.

6. The cured silicone elastomeric foam resulting from the method of claim 2.

* * * * *